Dec. 18, 1934.  J. M. VETTER  1,984,556
AUTOMATIC CHANGE SPEED GEAR MECHANISM
Filed Nov. 9, 1932  4 Sheets-Sheet 1

Inventor:
Johan Machiel Vetter
By Williams, Bradbury, McCaleb & Hinkle
Attys.

Dec. 18, 1934.    J. M. VETTER    1,984,556
AUTOMATIC CHANGE SPEED GEAR MECHANISM
Filed Nov. 9, 1932    4 Sheets-Sheet 2

Inventor:
Johan Machiel Vetter
By Williams, Bradbury, McCalb + Hinkle
Attys.

Dec. 18, 1934.   J. M. VETTER   1,984,556
AUTOMATIC CHANGE SPEED GEAR MECHANISM
Filed Nov. 9, 1932   4 Sheets-Sheet 3

Inventor:
Johan Machiel Vetter
By Williams, Bradbury, McCaleb & Hinkle
Attys.

Dec. 18, 1934.   J. M. VETTER   1,984,556
AUTOMATIC CHANGE SPEED GEAR MECHANISM
Filed Nov. 9, 1932   4 Sheets-Sheet 4

Inventor:
Johan M. Vetter
By Williams, Bradbury, McCaleb & Hinkle
Attys.

Patented Dec. 18, 1934

1,984,556

UNITED STATES PATENT OFFICE 1,984,556

AUTOMATIC CHANGE SPEED GEAR MECHANISM

Johan Machiel Vetter, The Hague, Netherlands

Application November 9, 1932, Serial No. 641,877
In the Netherlands November 11, 1931

26 Claims. (Cl. 74—336.5)

REISSUED
JUN 24 1941

The invention relates to an automatic change speed gear mechanism operating between a driving and a driven shaft, and is more particularly adapted for motor vehicles of the type wherein the gears are automatically shifted by means of a regulating mechanism cooperating with a pneumatic shifting mechanism.

The device according to the invention is of special interest for motor vehicles, but it can also be adapted to other devices in which the transmission ratio between driving shaft and driven shaft must be altered according to circumstances of load, in other words, in which a gradual acceleration of the driven shaft which carries the load has to be effected.

While by hand operated change speed gear mechanisms the acceleration of the driven shaft can only be carried out in a fashion lacking all graduality or evenness, that is to say shock-like, this undesirable condition is completely removed by the fully automatic device according to the invention. The engine driver only has to bring the device into operative condition by carrying out a simple manual operation, for instance to turn an electric switch, and then the device will automatically shift the different gears successively in such a way that an absolutely gradual acceleration of the driven shaft is obtained.

Moreover the successive shifting of the gears is carried out in such close succession, with such evenness and without any shock, that during the automatic acceleration from lowest to highest gear, there is never a period in which the driven shaft keeps revolving for some time at the number of revolutions corresponding to the maximum rotational speed obtained with the gear last brought into operation. It is to be understood that during the total acceleration period from lowest gear to direct drive, there is no change in the number of revolutions per minute of the driving shaft and neither in the power provided per revolution of said shaft. This implies in the case of the driving shaft, being the shaft of a combustion engine, that the fuel admission to said engine remains unaltered during the acceleration period of the driven shaft.

When under these circumstances the driven shaft, braked by the load it is carrying, is brought from a standstill to the highest obtainable rotational speed corresponding with the first gear, the second gear in close succession begins to accelerate the driven shaft, at the same time the first gear is gradually shifted out of operation, and so on.

In this way a sudden and shock-like acceleration is prevented. Only when the maximum rotational speed of the driven shaft, corresponding to the highest gear, that is, according to the direct drive or the over-speed gear, has been obtained under these circumstances of constant fuel admission to the power supplying internal combustion engine, said fuel admission is increased, and from then on the rotational speed is regulated by means of the amount of fuel admitted to the cylinders of the combustion engine.

According to the above, two phases in the degree of fuel admission have to be observed: (a) Constant fuel admission before the highest gear (direct drive or overspeed gear) has been put into operation. (b) Variable fuel admission after the maximum rotational speed with the highest gear has been obtained.

In the following these two phases in the degree of fuel admission will be shortly denominated (a) constant gas, (b) variable gas.

The amount of constant gas depends on the desired initial rotational speed of the driven shaft, the initial speed being the maximum speed of the driven shaft obtainable in the highest gear with constant fuel admission.

The initial speed can be fixed at any desired number of revolutions per minute of the driven shaft, corresponding with any speed on the road of the car. For instance the initial speed may be fixed at five miles an hour, or it may be required that within a certain number of seconds after starting a road speed of seventy miles is obtained, said number of seconds being required for gradually accelerating from a standstill to initial road speed by means of the different gears.

The present invention is characterized by the following features.

The automatic change speed gear mechanism is coupled with the driven shaft.

According to the invention, a fan is coupled with the driven shaft, by means of which fan a difference of pressure (vacuum or an overpressure) is generated, the amount of which corresponds with the number of revolutions per minute of said driven shaft. A pneumatic servo-motor is provided, which, operating under the influence of the difference of pressure and corresponding to the amount thereof, causes an electric switch to occupy successive positions according to which the current provided by an electric power supply is successively directed to coils, which command the air distributing valves of servo-motors which operate the shifting rods of the different gears.

According to the invention the transmission ratio for the gear wheels of the different gears is such that during the course of the successive operation of said gears the driven shaft is submitted to a gradual acceleration.

According to the invention the operation of each of the gears is obtained by shifting a smoothly operating coupling clutch into operative position, while the gear wheels of the gears are constantly meshing.

According to the invention the shifting rod of each of the gears is connected with a spring-actuated piston rod, on which two pistons are mounted, which operate in two separate cylinders, said piston rods serving for operating said shifting rods.

According to the invention the shifting mechanism for the smoothly operating coupling clutches is constructed in such a way that the clutch belonging to the gear which is to be made inoperative is only shifted completely out of its operative position after the clutch belonging to the gear which is to be made operative has already been shifted in its operative position in such a way that for a short time both clutches are in operative position.

A further characteristic feature of the invention consists therein that in order to obtain a smooth operation of the shifting rods of the gears the inlet valves of the foremost of the two pneumatic cylinders actuating said rods are constructed with a greater overlap than those of the other cylinder.

Finally the device according to the invention is characterized thereby that in the conduit which connects the fan coupled with the driven shaft, with the pneumatic device for actuating the electric switch, a throttle is arranged which is coupled with the gas or fuel admission handle.

In the drawings a form of execution of the device according to the invention is illustrated.

Fig. 3 shows the servo-motor which operates the switch for distributing the current of the electric power supply, said servomotor being constructed as an ordinary manometer spring tube.

Fig. 4 is a cross section through the hand operated switch mounted on the steering wheel.

Fig. 5 is a view of this switch, with the cover removed.

Figs. 8, 9 and 10 are details of the electric relay.

Fig. 11 shows the arrangement of the cylinders of the pneumatic device in a front view.

The gear wheels of the transmission mechanism are constantly meshing. The gear wheels mounted on the driving shaft 1 can be connected with said shaft. The gear wheels mounted on the driven shaft are fixed to said shaft. The gear wheels on the driving shaft 1 can be connected with said shaft by means of smoothly operating coupling clutches.

Figures 1, 2:
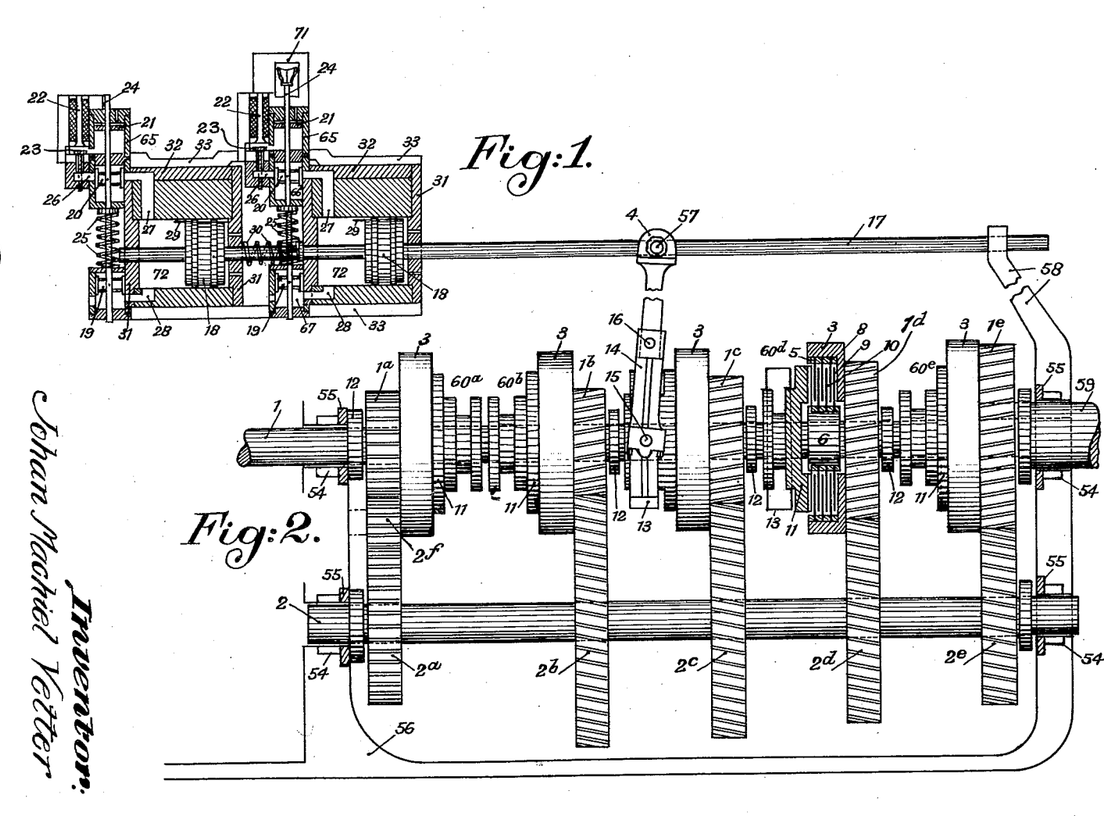
Fig 1 is a longitudinal section through the pneumatic device for actuating the gear shifting rods.
Fig. 2 is a view partly in section of one embodiment of the gear mechanism in which three shafts are employed.

Inside the casing 56 are arranged the driving or motor shaft 1, and the driven shaft 2 for the transmission of the torque to the cardan shaft 59. (Fig. 2).

On the driving shaft 1 the gear wheels 1a for the reverse, 1b for the first gear, 1c for the second gear, 1d for the third gear and 1e for the fourth gear are rotatably mounted. Said gear wheels are constantly meshing with the gear wheels fixed to the driven shaft, with which they cooperate.

The gear wheels 2a, 2f, 2b, 2c, 2d and 2e serve for the same purpose.

The wheel 1e is fixed to the cardan shaft 59, in which the end of the driving shaft revolves. When the motor operates and the motor clutch is shifted into operative position, the driving shaft 1 can rotate freely inside of the gear wheels.

In order to connect the gear wheels with the driving shaft, they are coupled with said shaft by means of a clutch of the disc type, comprising several discs.

At the back of each of the gear wheels rings 12 are mounted, which serve for keeping the gear wheels in their proper places and also for having the gear wheels pressed tightly against them.

In consequence of the inclined position of the teeth on the gear wheels, the driving gear wheel, when performing its driving duty, will be pressed tightly against the clutch, while when running idle just the reverse will happen, because said gear wheel will then be driven itself by the secondary gear wheel.

The clutch comprises a large drum 3 provided with ribs 5, large discs 8, a small drum 6 with ribs 7, and the small discs 9, and friction discs 10 between the discs 8 and 9.

The small drum 6 is fixed to the driving shaft 1. The large drum 3 is connected with the gear wheel 1d. The pressure plate 11, which serves for compressing the disc cluch, is shiftably mounted on the shaft 1. The ring 13 is in two pieces which are connected by bolts, and with said ring the pressure plate 11 is pressed against the clutch.

With the forked levers 14 (one of which has been illustrated in the drawings), which are pivotally mounted in pivots 16, the change speed gear mechanism (Fig. 2) is connected with the pneumatic device (Fig. 1). For carrying out the coupling operation, the fork 4 which is connected with the piston rod 17 is pulled to the left by said rod 17, in consequence thereof the lower arm of the lever 14, together with the ring 13 and the pressure plate 11 are shifted to the right and cause the clutch to operate.

The pneumatic device is illustrated in Fig. 1. The pistons 18 of this device are actuated under the influence of a difference in pressure, and by means of an electric regulating device they can be put in or out of operation. For the actuating of the pistons vacuum is used. The device comprises the following parts.

Two cylinder castings are provided, each containing four cylinders 72 for the ahead gears and one cylinder 73 for the reverse gear (Fig. 11). The cylinders are arranged in such a way that always two cylinders in line cooperate (Fig. 11). The piston rod 17 for one gear is common for both cylinders. Inside the cylinders work the pistons 18 with their piston rings 29. In the walls of the cylinders are arranged the suction canals 27 and the canals 28 for the connection with the atmosphere. In the cover plates 32 said canals 27 are arranged horizontally.

The front and back covers 31 close the cylinder. The springs 30 between the cylinder blocks serve for pushing the pistons back into the position corresponding with the position of the clutch when it is out of operation.

At the end of the stroke of the piston the ring 29 is pushed against the admission opening of the canal 27 under the influence of the vacuum in the canal 27. In consequence of this circumstance the shock which the mechanism would otherwise receive is now smoothed off, because the suction opening becomes gradually smaller.

The mechanism for actuating the reverse gear is in opposite position to that for the ahead gears.

The reverse coupling clutch on the driving shaft is shifted to the left instead of to the right and in consequence thereof the pistons belonging to said mechanism must be also shifted in opposite direction, that is to the right instead of to the left. Therefore the canals 27 are positioned at the opposite ends of the cylinders.

At the front part of each of the cylinder castings the electric relays are arranged. The coils 22 actuate the paper covered relay valves 23. The paper serves for preventing the valve from knocking against the metal heart of the coil. Instead of paper leather can be used. The relay comprises further the piston 21, the upper cylindrical valve 20 and the lower cylindrical valve 19, which are connected with the relay piston 21 by means of the piston rod 24. By means of the spring 25 the cylindrical valves are pushed upwards into the inoperative position. By means of the suction pipe 26 connected with the suction side of the internal combustion engine the vacuum is obtained.

The upper cylindrical valves are unequal in length. For the ahead gears those belonging to the cylinders nearest to the forks 14 are shorter than those of the other cylinders.

In consequence of the fact that when the electric current is admitted to the coils the two relay pistons 21 together with the cylindrical valves move downward in direction, the cylindrical valves at the back will open the suction canal sooner than those in front.

The lower cylindrical valves 19 cut off the connection with the atmosphere. In consequence of the fact that the cylinders are emptied unequally a smooth and gradual operation of the coupling clutch is obtained.

Figures 3, 9:
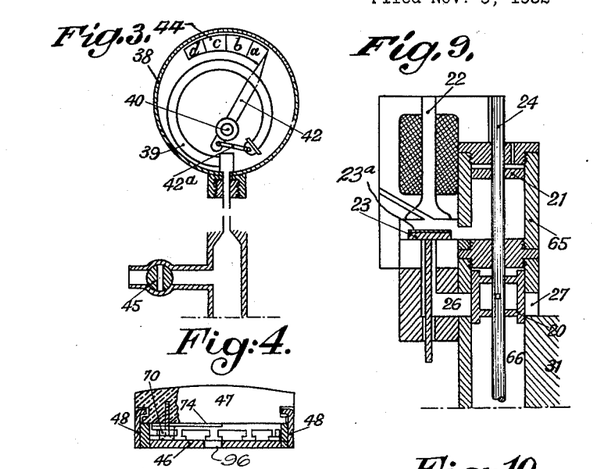
Figure 6:
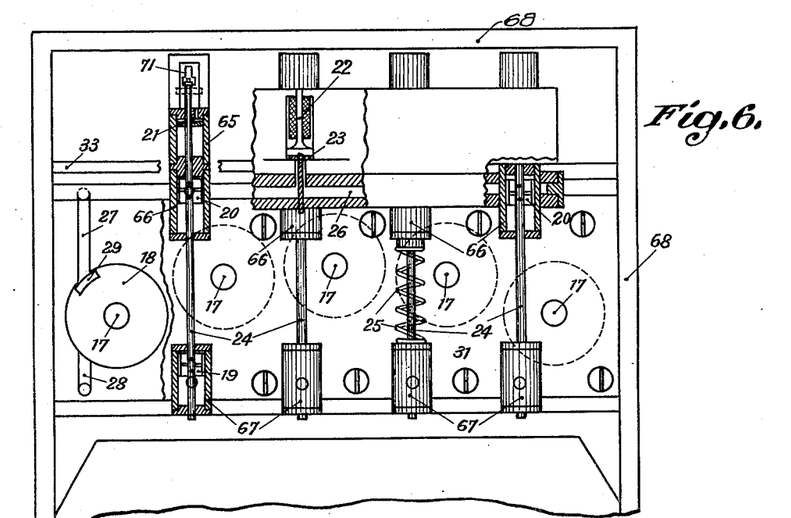
Fig. 6 is a front view partly in section of the pneumatic actuating mechanism for the gear shifting rods.
Figures 12, 13, 13A, 14, 15, 16:
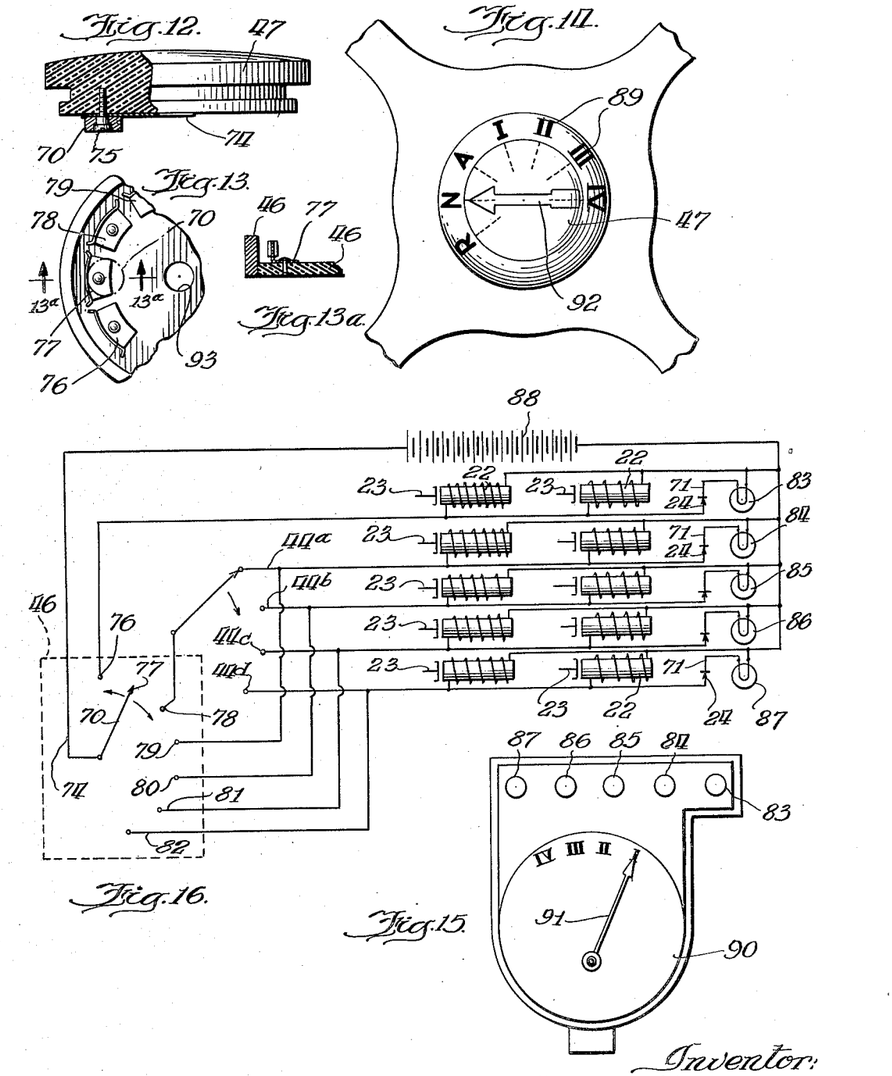
Figure 12 shows the cover of the hand operated switch 47 with the small copper plate 74 and the contact roller 70 which turns on the spindle 75.
Figure 13 shows how the contact springs are bent and the way in which the contact roller 70 cooperates with the springs.
Figure 13a is a cross section along the line 13a—13a of Figure 13.
Figure 14 shows the arrow and the inscriptions on the cover of the hand operated switch box, respectively for reverse, neutral, automat and hand operated gears: I, II, III, IV.
Figure 15 shows the optical signs and the dial of the manometer.
Figure 16 shows the wiring-diagram.

The operation of the relay is carried out by means of the pneumatic servomotor illustrated in Fig. 3, with the exception of the reverse gear which is commanded with a hand operated switch within reach of the driver (Fig. 14).

The pneumatic servomotor of Fig. 3 is operated by means of overpressure obtained with a fan 34, the rotational speed of which depends on that of the driven shaft 2 or on the cardan shaft 59.

Figure 7:
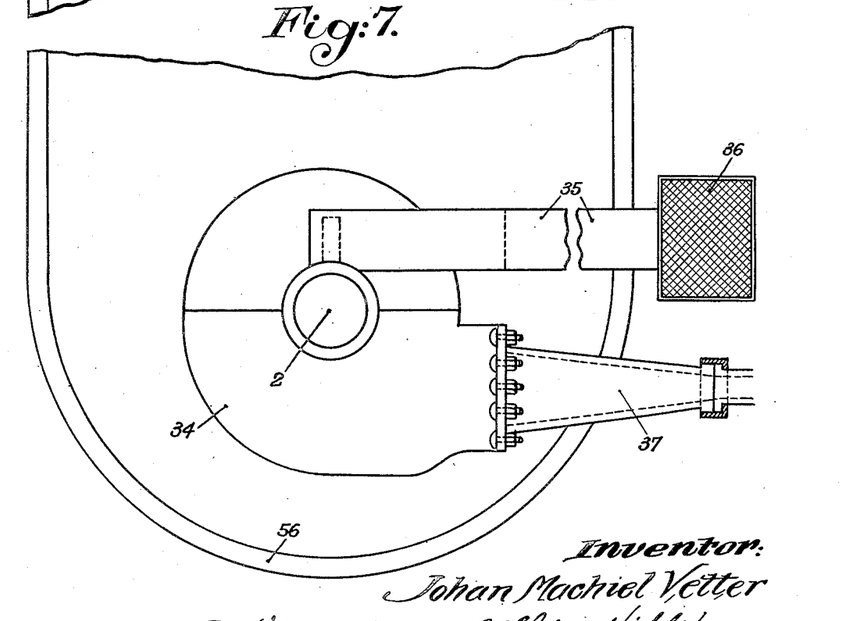
Fig. 7 is a view of the fan.
Figure 8:
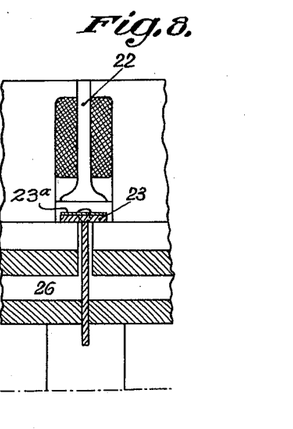

According to one embodiment of the invention the fan is mounted on the driven shaft 2 (Fig. 7). The suction pipe 35 projects from the casing and is turned with the inlet opening to the wind. The inlet opening is covered with a sieve 36.

The pressure pipe 37 of the fan is connected with the inside of the bent manometer spring tube 39 and said tube constitutes in itself the pneumatic servomotor 38 which acts as pneumatic current distributer.

Said pneumatic current distributer comprises the following parts:

An excentrically bent hollow tube 39 of elliptical cross section, a shaft 40, the current distributer 42 with the small connection rod 42a. By means of celluloid the distributer is insulated from the shaft.

The contact plates 44a, b c and d correspond with the first, second, third and fourth gear and are mounted on a piece of insulating material which is fixed to the manometer casing.

A dial 90 is provided on which inscriptions (I, II, III, IV) are made corresponding with the different positions of the distributer.

In the pipe leading to the tube 39 of the pneumatic servomotor a valve 45 is arranged, by means of which the over-pressure in said pipe can be lowered to a certain degree by permitting the air to escape to the atmosphere. Said valve is operatively connected with the fuel inlet mechanism, for the internal combustion engine and opens and closes together with said fuel inlet. This measure is necessary when driving with a high road speed, and especially when driving with a high initial speed.

The whole of the automatic change speed gear mechanism according to the invention is operated by the driver by means of a switch-box (Figs. 4, 5 and 14) arranged on the steering wheel. Said switch box 46 consists of a bottom with an erect marginal flange. The cover 47 of this box is provided with a rounded surface adapted to the hollow inside of the hand and serves as the switch. The ring 48 is screwed around the box and enters into a groove of the cover 47, in such a way that the cover can revolve inside the ring 48.

Inside the erect marginal flange seven contact springs 76, 77, 78, 79, 80, 81 and 82 are arranged, which are connected with the bottom by means of screws. These contact springs do not touch the flange. These springs are bent in such a way that the contact mounted in the cover remains in the middle of the spring and does not slip off on its own account.

One of the contact springs 77 (Figures 13 and 16) only serves for keeping the cover in its neutral position and is not connected with a current conducting wire (Figure 16).

From left to right appear in Fig. 5 the springs for "reverse" 76, "neutral" 77, "automatic" 78 and four other springs for hand operated transmission, first 79, second 80, third 81 and fourth 82. The hand operated transmission makes it possible to continue driving in a certain gear and may also be used if the automatic device is out of commission.

Against the bottom surface of the cover 47 a small copper plate 74 is fixed and is provided with a current conducting wire (Figure 16), together with a small roller 70, which can revolve around a small shaft, which is screwed through the plate 74 into the cover. This roller can roll along the contact springs (see Fig. 13) and closes the current circuit. In the centre of the bottom of the box an opening 93 is provided for introducing the current conducting wires. On the cover 47 an arrow 92 (Fig. 14) is illustrated and around the cover on the steering wheel figures 89 are drawn, corresponding with the situation of the different contact springs (Fig. 14); for obtaining the different positions the cover has to be turned until the arrow 92 points to the figure which stands for the required contact.

Finally there are provided optical signs 83, 84, 85, 86, 87 (Figure 15). The needle 91 on the dial 90 of manometer 38 indicates the four different positions of the distributor 42 according to the overpressure generated by the fan 34 in the pipe 37 which leads to the distributer 42. The optical signs consist in small electric lamps 83, 84, 85, 86, 87 (Figure 15) arranged on the dashboard which enable the driver to see, which of the gears is in commission. The lamps have different colours.

The lamp 83 for "reverse" is white.
The lamp 84 for "first gear" is yellow.
The lamp 85 for "second gear" is red.
The lamp 86 for "third gear" is blue.
The lamp 87 for "fourth gear" is green.

For fourth gear a green lamp 87 is used, this being the colour which is most beneficial for the eyes.

The electric power supply can consist in an accumulator or a generator of about 12 volts.

The device according to the invention operates as follows.

When the car is standing still, the arrow on the switch box 46 indicates neutral. The motor is started while the motor clutch (not illustrated) is shifted out of operation. Now the arrow is turned to "automatic" and consequently the first gear is shifted into operative position. Now the yellow lamp is burning.

The electric current now flows from the electric power supply 88 to the switch box 46 (Figs. 4, 5 and 16), from there over the small copper plate 74, the roller 70, the contact springs 78 to the current distributer 42 (Figs. 3 and 16) and then along the contact piece 44a to the coils 22 (Figs. 1 and 16), next it passes the trailing contact 71 on the valve stem 24 on its way to the lamp 84 and after that it returns to the power supply.

The coils 22 of the first gear now lift the relay valves 23. The internal combustion engine can now empty the cylinders 65 and thereby pull the relay pistons 21 downward in direction. At the same time the cylindrical valves 19 and 20 are shifted.

The upper valves 20 connect the canals 27 with the suction pipe 26, and the lower valves 19 cut off the inside of the cylinder from the atmosphere.

The cylinders 72 are now emptied. The back cylinder (nearest fork 14) is emptied sooner than the front. The pistons 18 move to the left with the piston rod 17. In consequence thereof the lower arm 15 of the lever 14 is moved to the right. The clutch of the first gear is shifted into operative position and the first gear is brought into operation.

We now fix an initial speed, the height of which is in itself not so very important, because independent thereof that a low or a high initial speed is chosen, the car will always start smoothly without any shock. This is due to the disc-clutches, both of the motor clutch and of the first gear, which ensure a smooth start. According to the initial speed which we have chosen the fuel admission to the combustion engine is regulated and in consequence of the fact that the fuel admission mechanism, e. g. the gas-pedal or lever, is connected with the control valve 45, this control valve will follow the gas-admission mechanism and will open.

The minimum initial speed at which the servomotor 38 can work has been fixed at 5 km. per hour (about 2.8 miles per hour). With a lower initial speed the number of revolutions per minute of the ventilator 34 is too little to produce a sufficient pressure necessary for actuating the current distributer 42.

Up to 5 km./hour the valve 45 remains closed. Above this speed the valve gradually opens. This is necessary, for if the over-pressure would not be partly relieved, it would occur that with a great initial speed the automatic current distributer, instead of gradually putting into operation the successive gears, would jump from first to fourth gear.

Now we lift our foot from the motor clutch pedal and the car is running in first gear.

It is obvious that the initial speed when driving in first gear is not so great as the ultimate speed obtained when driving in this gear, because at first the motor disc-clutch is not fully operative, gradually there is no more slipping of the motor disc-clutch and at last the motor has accelerated the car up to the ultimate speed obtainable with the chosen amount of fuel admission when driving in the first gear. At that time the rotational speed of the ventilator has increased so much that the pressure obtained with it is sufficient for bringing the distributer 42 into the position for second gear, and abandoning the first gear. However, the first gear is not abandoned all at once by the pneumatic actuating mechanism. The springs 25 begin to lift the circular valves and to open the connection 28 with the atmosphere. The upper valve of the front cylinder has already cut off the connection with the suction pipe when the upper valve of the back cylinder has still to complete this, and when both are shut is still takes some time before the large cylinder is completely filled with air, and the pistons are shifted back by means of the spring 30.

The time required for this is very short, but sufficient to prevent a sudden break-off, and it is longer than the time required for emptying the cylinders of the second gear.

The coupling operation in the second gear is also carried out without any shock. This is obtained by emptying the front and back cylinders unequally and by the smooth operation of the clutch. Here too, the initial speed is lower than the ultimate speed. Consquently when said ultimate speed has been reached the rotational speed of the fan is sufficient to induce the distributer to the position corresponding to third gear.

For shifting in the fourth gear the same thing is repeated over.

Now the speed of the car can be increased by increasing the amount of fuel admitted to the combustion engine. Also the valve 45 is still opened further so that no overpressure is available for the manometer.

If the car is on a slope, it may occur that the engine is not powerful enough to drive the car in the highest gear, and although the fuel admission remains unvaried, the speed of the car decreases. In consequence thereof the fan is rotating slower and the valve 45 remaining in open position will cause the distributer to occupy a position corresponding with a lower gear. The torque on the motor shaft is in this way diminished. This includes the advantage that gear shifting by hand when driving up a slope is no longer necessary.

The following are some figures relating to the operation of the device (Fig. 2).

The relation between the diameters of the gear wheels is as follows:

|  | Driving shaft | Driven shaft |
|---|---|---|
| First gear | 8 | 19 |
| Second gear | 9 | 18=1:2 |
| Third gear | 11 | 16 |
| Fourth gear | 13½ | 13½=1:1 |

We assume that for an initial road speed of 5 km./hour the motor shaft makes 200 revolutions per minute. This number of revolutions is assumed for the highest gear. Now after lifting our foot from the motor clutch pedal some time will elapse before the driving gear wheel of the first gear will have reached the same number of revolutions per minute as the motor shaft, that is 200 revolutions per minute, because said gear wheel is exposed to the braking influence of the car.

As soon as this number of revolutions is reached, the secondary gear wheel $2b$ makes $8/19 \times 200 = 84.21$ revolutions per minute. The secondary gear wheel $2e$ also makes 84.21 revolutions per minute and in consequence of the relation 1:1 between the wheels $2e$ and $1e$, the cardan shaft also makes 84.21 revolutions per minute. The gear wheel $1c$ of the second gear which rotates freely on the driving shaft and which is rotating together with the secondary gear wheel $2c$ makes $18/9 \times 84.21 = 168.42$ revolutions per minute.

Now the second gear is shifted into operation and the driving shaft which keeps revolving with 200 revolutions per minute will accelerate the wheel $1c$ of the second gear from 168.42 to 200 revolutions per minute. When this has been done, the secondary wheel $2c$ makes $½ \times 200 = 100$ revolutions, and also the cardan shaft, while the wheel $1d$ of the third gear makes $16/11 \times 100 = 145.45$ revolutions per minute.

Now the third gear is shifted into operation and the wheel $1d$ is brought from 145.45 to 200 revolutions per minute. Now the secondary wheel $2d$ revolves with $11/16 \times 200 = 137.5$ revolutions per minute, also the cardan shaft.

Finally when shifting into the fourth gear the cardan shaft is brought from 137.5 to 200 revolutions per minute. After this the speed is increased by increasing the admission of fuel.

Because the clutches release gradually, sudden acceleration of the shaft is prevented.

Also the next clutch is put into operation a little quicker than the former is released, and so undesirable acceleration of the shaft is impossible.

The driving shaft will practically keep revolving with the same rotational speed and without intermission the driven shaft will be gradually accelerated.

According to the foregoing, the mechanism successively revolves with the following number of revolutions per minute:

| Ultimate speed | First gear | 84.21 revolutions p. min. |
|---|---|---|
| Do | Second gear | 100 revolutions p. min. |
| Do | Third gear | 137.5 revolutions p. min. |

According to these figures, the automatic device is adjusted for successively shifting the different gears into operation while the motor shaft keeps revolving at 200 revolutions per minute in such a way that ultimately the car runs with a speed of 5 km./hour in the highest gear.

From now on the constant amount of fuel admission, which has been maintained throughout the successive operation of the different gears and which corresponds to a driving speed of 5 km./hour in the highest gear, may be abandoned and said amount of fuel admission increased at will until the desired driving speed of the car (e. g. 60 km./hour or more) is reached.

What I claim is:

1. Automatic change speed gear mechanism specially adapted for motor vehicles comprising a driven shaft, a fan mounted on said driven shaft, a first pneumatic servomotor operating under the influence of the difference in pressure generated by said fan, a current distributing device comprising several contact pieces operated by said pneumatic servomotor, an electric power supply connected with said current distributing device, conducting means fixed to the contact pieces of the current distributing device, coils connected with said conducting means, a second pneumatic servomotor, a differential pressure supply for actuating said last mentioned pneumatic servomotor, control means for controlling the admission and the outlet of the air of said last mentioned pneumatic servomotor, said control means being actuated by said coils, a driving shaft, gear wheels freely rotating on said driving shaft, gear wheels fixed to said driven shaft, said gear wheels on said driven shaft constantly meshing with said gear wheels on said driving shaft, coupling means for coupling said gear wheels on said driven shaft with said driving shaft, connecting means for connecting said last mentioned pneumatic servomotor with one of said coupling means, a hand operated switch for putting the automatic device into or out of operation.

2. Automatic change speed gear mechanism specially adapted for motor vehicles, comprising a driven shaft, a fan mounted on said driven shaft, a hollow circular manometer tube operating under the influence of the difference in pressure generated by said fan, a current distributing device comprising several contact pieces, operated by said pneumatic servomotor, an electric power supply connected with said current distributing device, conducting means fixed to the contact pieces of the current distributing device, coils connected with said conducting means, a second pneumatic servomotor, a differential pressure supply for actuating said last mentioned pneumatic servomotor, control means for controlling the admission and the outlet of the air of said last mentioned pneumatic servomotor, said control means being actuated by said coils, a driving shaft, gear wheels freely rotating on said driving shaft, gear wheels fixed to said driven shaft, said gear wheels on said driven shaft constantly meshing with said gear wheels on said driving shaft, coupling means for coupling said gear wheels on said driven shaft with said driving shaft, connecting means for connecting said last mentioned pneumatic servomotor with one of said coupling means, a hand operated switch for putting the automatic device into or out of operation.

3. Automatic change speed gear mechanism specially adapted for motor vehicles, comprising a driven shaft, a fan mounted on said driven shaft, a first pneumatic servomotor operating under the influence of the difference in pressure generated by said fan, a current distributing device comprising several contact pieces operated by said pneumatic servomotor, an electric power supply connected with said current distributing device, conducting means fixed to the contact pieces of the current distributing device, coils connected with said conducting means, small valves operated by said coils, valve actuating pistons controlled by said small valves, large valves arranged on the piston rods of said valve actuating pistons, other pistons controlled by said larger valves, a differential pressure supply for actuating said other pistons, a driving shaft, gear wheels freely rotating on said driving shaft, gear wheels fixed to said driven shaft, said gear wheels on said driven shaft constantly meshing with said gear wheels on said driving shaft, coupling means for coupling said gear wheels on said driven shaft with said driving shaft, connecting means for operatively connecting said last mentioned pistons with said coupling means, a hand operated switch for putting the automatic device in or out of operation.

4. Automatic change speed gear mechanism specially adapted for motor vehicles, comprising a driven shaft, a fan mounted on said driven shaft, a hollow circular manometer tube operating under the influence of the difference in pressure generated by the fan, a current distributing device comprising several contact pieces, operated by said pneumatic servomotor, an electric power supply connected with said current distributing device, conducting means fixed to the contact pieces of the current distributing device, coils connected with said conducting means, small valves operated by said coils, valve actuating pistons controlled by said small valves, large valves arranged on the piston rods of said valve actuating pistons, other pistons controlled by said large valves, a differential pressure supply for actuating said other pistons, a driving shaft, gear wheels freely rotating on said driving shaft, gear wheels fixed to said driven shaft, said gear wheels on said driven shaft constantly meshing with said gear wheels on said driving shaft, coupling means for coupling said gear wheels on said driven shaft with said driving shaft, connecting means for operatively connecting said last mentioned pistons with said coupling means, a hand operated switch for putting the automatic device in or out of operation.

5. Automatic change speed gear mechanism, specially adapted for motor vehicles, comprising a motor shaft, a cardan shaft, gear wheels fixed to said cardan shaft meshing with gear wheels rotatably mounted on said motor shaft, coupling means for coupling said gear wheels on the motor shaft with said motor shaft, springs for maintaining said coupling means in their inoperative positions, a number of pneumatic servo-motors for actuating said coupling means, a pneumatic power supply, inlet and outlet elements for the air of said pneumatic servo-motors, a number of pneumatic actuating means for actuating said inlet and outlet elements, a number of electric control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electric control means for controlling the distribution of the air in said first mentioned number of pneumatic servo-motors, said contact means being arranged on said switch in such a way that either the electric current circuit of the distributing device or one of the circuits of the different electric control means can be put in commission, such as desired.

6. Automatic change speed gear mechanism specially adapted for motor vehicles, comprising a motor shaft, a cardan shaft, a counter shaft, transmitting means for transmitting the torque from said countershaft to said cardan shaft, gear wheels freely rotating on said motor shaft constantly meshing with gear wheels fixed on said countershaft, coupling means for coupling said gear wheels on the motor shaft with said motor-shaft and for directly coupling said motor-shaft with said cardan shaft, springs for maintaining said coupling means in their inoperative positions, a number of pneumatic servo-motors for actuating said coupling means, a pneumatic power supply, inlet and outlet elements for the air of said pneumatic servo-motors, a number of pneumatic actuating means for actuating said inlet and outlet elements, a number of electric control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electrical control means for controlling the distribution of the air in said first-mentioned number of pneumatic servo-motors, said contact means being arranged on said switch in such a way that either the electric current circuit of the distributing device or one of the circuits of the different electric control means can be put in commission, such as desired.

7. Automatic change speed gear mechanism, specially adapted for motor vehicles, comprising a motor shaft, a cardan shaft, gear wheels fixed to said cardan shaft meshing with gear wheels rotatably mounted on said motor shaft, coupling means for coupling said gear wheels on the motor shaft with said motor shaft, springs for maintaining said coupling means in their inoperative positions, a number of pneumatic servo-motors for actuating said coupling means, comprising small electrically operated control valves, cylindrical inlet and outlet valves, small pistons actuating said cylindrical valves and controlled by said electrically operated small valves, springs for bringing back said cylindrical valves to their initial position, large pistons controlled by said cylindrical inlet and outlet valves, said pistons being connected with said coupling means, a pneumatic power supply, a number of pneumatic actuating means for actuating the inlet and the outlet valves for the air of said pneumatic servo-motors, a number of electrical control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electric control means for controlling the distribution of the air in said first mentioned number of pneumatic servo-motors, said contact means being arranged on said switch in such a way that either the electric current circuit of the distributing device or one of the circuits of the different electric control means can be put in commission, such as desired.

8. Automatic change speed gear mechanism specially adapted for motor vehicles, comprising a motor shaft, a cardan shaft, a counter shaft, transmitting means for transmitting the torque from said counter shaft to said cardan shaft, gear wheels freely rotating on said motor shaft constantly meshing with gear wheels fixed on said countershaft, coupling means for coupling said gear wheels on the motor shaft with said motor-shaft and for directly coupling said motor-shaft with said cardan shaft, springs for maintaining said coupling means in their inoperative positions, a number of pneumatic servo-motors for actuating said coupling means, comprising small electrically operated control valves, cylindrical inlet and outlet valves, small pistons actuating said cylindrical valves and controlled by said electrically operated small valves, springs for bringing back said cylindrical valves to their initial position, large pistons controlled by said cylindrical inlet and outlet valves, said pistons being connected with said coupling means, a pneumatic power supply, a number of pneumatic actuating means for actuating the inlet and the outlet valves for the air of said pneumatic servo-motors, a number of electrical control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand-operated switch connected with said electric power supply, contact means on said switch corresponding with the electric current circuit of said distributing device, a further number of contact means on said switch corresponding respectively with the electric current circuits of the several electrical control means for controlling the distribution of the air in said first-mentioned number of pneumatic servo-motors, said contact means being arranged on said switch in such a way that either the electric current circuit of the distributing device or one of the circuits of the different electrical control means can be put in commission, such as desired.

9. Automatic change speed gear mechanism, specially adapted for motor vehicles, comprising a motor shaft, a cardan shaft, gear wheels fixed to said cardan shaft meshing with gear wheels rotatably mounted on said motor shaft, coupling means for coupling said gear wheels on the motor shaft with said motor shaft, springs for maintaining said coupling means in their inoperative position, a number of pneumatic servo-motors for actuating said coupling means, a pneumatic power supply, inlet and outlet elements for the air of said pneumatic servo-motors, a number of pneumatic actuating means for actuating said inlet and outlet elements, a number of electric control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electric control means for controlling the distribution of the air in said first mentioned number of pneumatic servo-motors, said contact means being arranged on said switch in such a way that either the electric current circuit of the distributing device or one of the circuits of the different electric control means can be put in commission, such as desired, said pneumatic servo-motor for actuating the current distributing device being formed as a manometer.

10. Automatic change speed gear mechanism specially adapted for motor vehicles, comprising a motor shaft, a cardan shaft, a counter shaft, transmitting means for transmitting the torque from said countershaft to said cardan shaft, gear wheels freely rotating on said motor shaft constantly meshing with gear wheels fixed on said countershaft, coupling means for coupling said gear wheels on the motor shaft with said motor-shaft and for directly coupling said motor-shaft with said cardan shaft, springs for maintaining said coupling means in their inoperative positions, a number of pneumatic servo-motors for actuating said coupling means, a pneumatic power supply, inlet and outlet elements for the air of said pneumatic servo-motors, a number of pneumatic actuating means for actuating said inlet and outlet elements, a number of electric control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electrical control means for controlling the distribution of the air in said first-mentioned number of pneumatic servo-motors, said contact means being arranged on said switch in such a way that either the electric current circuit of the distributing device or one of the circuits of the different electric control means can be put in commission, such as desired, said pneumatic servo-motor for actuating the current distributing device being formed as a manometer.

11. Automatic change speed gear mechanism, specially adapted for motor vehicles, comprising a motor shaft, a cardan shaft, gear wheels fixed to said cardan shaft meshing with gear wheels rotatably mounted on said motor shaft, coupling means for coupling said gear wheels on the motor shaft with said motor shaft, springs for maintaining said coupling means in their inoperative positions, a number of pneumatic servo-motors for actuating said coupling means, comprising small electrically operated control valves, cylindrical inlet and outlet valves, small pistons actuating said cylindrical valves and controlled by said electrically operated small valves, springs for bringing back said cylindrical valves to their initial position, large pistons controlled by said cylindrical inlet and outlet valves, said pistons being connected with said coupling means, a pneumatic power supply, a number of pneumatic actuating means for actuating the inlet and the outlet valves for the air of said pneumatic servo-motors, a number of electrical control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electric control means for controlling the distribution of the air in said first-mentioned number of pneumatic servo-motors, said contact means being arranged on said switch in such a way that either the electric current circuit of the distributing device or one of the circuits of the different electric control means can be put in commission, such as desired, said pneumatic servo-motor for actuating the current distributing device being formed as a manometer.

12. Automatic change speed gear mechanism specially adapted for motor vehicles, comprising a motor shaft, a cardan shaft, a counter shaft, transmitting means for transmitting the torque from said counter shaft to said cardan shaft, gear wheels freely rotating on said motor shaft constantly meshing with gear wheels fixed on said countershaft, coupling means for coupling said gear wheels on the motor shaft with said motor-shaft and for directly coupling said motor-shaft with said cardan shaft, springs for maintaining said coupling means in their inoperative positions, a number of pneumatic servo-motors for actuating said coupling means, comprising small electrically operated control valves, cylindrical inlet and outlet valves, small pistons actuating said cylindrical valves and controlled by said electrically operated small valves, springs for bringing back said cylindrical valves to their initial position, large pistons controlled by said cylindrical inlet and outlet valves, said pistons being connected with said coupling means, a pneumatic power supply, a number of pneumatic actuating means for actuating the inlet and the outlet valves for the air of said pneumatic servo-motors, a number of electrical control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand-operated switch connected with said electric power supply, contact means on said switch corresponding with the electric current circuit of said distributing device, a further number of contact means on said switch corresponding respectively with the electric current circuits of the several electrical control means for controlling the distribution of the air in said first-mentioned number of pneumatic servo-motors, said contact means being arranged on said switch in such a way that either the electric current circuit of the distributing device or one of the circuits of the different electrical control means can be put in commission, such as desired, said pneumatic servo-motor for actuating the current distributing device being formed as a manometer.

13. Automatic change speed gear mechanism, specially adapted for motor vehicles, comprising a motor shaft, a cardan shaft, gear wheels fixed to said cardan shaft meshing with gear wheels rotatably mounted on said motor shaft, coupling means for coupling said gear wheels on the motor shaft with said motor shaft, springs for maintaining said coupling means in their inoperative positions, a number of pneumatic servo-motors for actuating said coupling means, comprising small electrically operated control valves, cylindrical inlet and outlet valves, small pistons actuating said cylindrical valves and controlled by said electrically operated small valves, springs for bringing back said cylindrical valves to their initial position, large pistons controlled by said cylindrical inlet and outlet valves, said pistons being connected with said coupling means, a pneumatic power supply, a number of pneumatic actuating means for actuating the inlet and the outlet valves for the air of said pneumatic servo-motors, a number of electrical control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said carden shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electric control means for controlling the distribution of the air in said first-mentioned number of pneumatic servo-motors, said contact means being arranged on said switch in such a way that either the electric current circuit of the distributing device or one of the circuits of the different electric control means can be put in commission, such as desired, each of said pneumatic servo-motors for actuating the coupling means comprising two cylinders in which work two pistons which are fixed on a single piston rod and the cylindrical valves which control the inlet of the air into said cylinders being provided with an overlap which is different for both cylinders.

14. Automatic change speed gear mechanism specially adapted for motor vehicles, comprising a motor shaft, a cardan shaft, a counter shaft, transmitting means for transmitting the torque from said counter shaft to said cardan shaft, gear wheels freely rotating on said motor shaft constantly meshing with gear wheels fixed on said countershaft, coupling means for coupling said gear wheels on the motor shaft with said motor-shaft and for directly coupling said motor-shaft with said cardan shaft, springs for maintaining said coupling means in their inoperative positions, a number of pneumatic servo-motors for actuating said coupling means, comprising small electrically operated control valves, cylindrical inlet and outlet valves, small pistons actuating said cylindrical valves and controlled by said electrically operated small valves, springs for bringing back said cylindrical valves to their initial position, large pistons controlled by said cylindrical inlet and outlet valves, said pistons being connected with said coupling means, a pneumatic power supply, a number of pneumatic actuating means for actuating the inlet and the outlet valves for the air of said pneumatic servo-motors, a number of electrical control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand-operated switch connected with said electric power supply, contact means on said switch corresponding with the electric current circuit of said distributing device, a further number of contact means on said switch corresponding respectively with the electric current circuits of the several electrical control means for controlling the distribution of the air in said first-mentioned number of pneumatic servo-motors, said contact means being arranged on said switch in such a way that either the electric current circuit of the distributing device or one of the circuits of the different electrical control means can be put in commission, such as desired, each of said pneumatic servo-motors for actuating the coupling means comprising two cylinders in which work two pistons which are fixed on a single piston rod and the cylindrical valves which control the inlet of the air into said cylinders being provided with an overlap which is different for both cylinders.

15. Automatic change speed gear mechanism, specially adapted for motor vehicles, comprising a motor shaft, a cardan shaft, gear wheels fixed to said cardan shaft meshing with gear wheels rotatably mounted on said motor shaft, coupling means for coupling said gear wheels on the motor shaft with said motor shaft, springs for maintaining said coupling means in their inoperative positions, a number of pneumatic servo-motors for actuating said coupling means, a pneumatic power supply, inlet and outlet elements for the air of said pneumatic servo-motors, a number of pneumatic actuating means for actuating said inlet and outlet elements, a number of electric control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electric control means for controlling the distribution of the air in said first mentioned number of pneumatic servo-motors, said contact means being arranged on said switch in such a way that either the electric current circuit of the distributing device or one of the circuits of the different electric control means can be put in commission, such as desired, and a reverse gear adapted to be operated by means of a coupling mechanism actuated by a pneumatic servo-motor, said last mentioned pneumatic servo-motor being controlled by an electrical control device which can be put into and out of operation by means of said hand operated switch, in such a way that by means of said switch either said automatic distributing device, or one of said ahead gears, or the reverse gear is put in operation.

16. Automatic change speed gear mechanism specially adapted for motor vehicles, comprising a motor shaft, a cardan shaft, a counter shaft, transmitting means for transmitting the torque from said countershaft to said cardan shaft, gear wheels freely rotating on said motor shaft constantly meshing with gear wheels fixed on said countershaft, coupling means for coupling said gear wheels on the motor shaft with said motor-shaft and for directly coupling said motor-shaft with said cardan shaft, springs for maintaining said coupling means in their inoperative positions, a number of pneumatic servo-motors for actuating said coupling means, a pneumatic power supply, inlet and outlet elements for the air of said pneumatic servo-motors, a number of pneumatic actuating means for actuating said inlet and outlet elements, a number of electric control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electrical control means for controlling the distribution of the air in said first-mentioned number of pneumatic servo-motors, said contact means being arranged on said switch in such a way that either the electric current circuit of the distributing device or one of the circuits of the different electric control means can be put in commission, such as desired, and a reverse gear adapted to be operated by means of a coupling mechanism actuated by a pneumatic servo-motor, said last mentioned pneumatic servo-motor being controlled by an electrical control device which can be put into and out of operation by means of said hand operated switch in such a way that by means of said switch either said automatic distributing device, or one of said ahead gears, or the reverse gear is put in operation.

17. Automatic change speed gear mechanism, specially adapted for motor vehicles, comprising a motor shaft, a cardan shaft, gear wheels fixed to said cardan shaft meshing with gear wheels rotatably mounted on said motor shaft, coupling means for coupling said gear wheels on the motor shaft with said motor shaft, springs for maintaining said coupling means in their inoperative positions, a number of pneumatic servo-motors for actuating said coupling means, comprising small electrically operated control valves, cylindrical inlet and outlet valves, small pistons actuating said cylindrical valves and controlled by said electrically operated small valves, springs for bringing back said cylindrical valves to their initial position, large pistons controlled by said cylindrical inlet and outlet valves, said pistons being connected with said coupling means, a pneumatic power supply, a number of pneumatic actuating means for actuating the inlet and the outlet valves for the air of said pneumatic servo-motors, a number of electrical control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electric control means for controlling the distribution of the air in said first-mentioned number of pneumatic servo-motors, said contact means being arranged on said switch in such a way that either the electric current circuit of the distributing device or one of the circuits of the different electric control means can be put in commission, such as desired, and a reverse gear adapted to be operated by means of a coupling mechanism actuated by a pneumatic servo-motor, said last mentioned pneumatic servo-motor being controlled by an electrical control device which can be put into and out of operation by means of said hand operated switch in such a way that by means of said switch either said automatic distributing device, or one of said ahead gears, or the reverse gear is put in operation.

18. Automatic change speed gear mechanism specially adapted for motor vehicles, comprising a motor shaft, a cardan shaft, a counter shaft, transmitting means for transmitting the torque from said counter shaft to said cardan shaft, gear wheels freely rotating on said motor shaft constantly meshing with gear wheels fixed on said countershaft, coupling means for coupling said gear wheels on the motor shaft with said motor-shaft and for directly coupling said motor-shaft with said cardan shaft, springs for maintaining said coupling means in their inoperative positions, a number of pneumatic servo-motors for actuating said coupling means, comprising small electrically operated control valves, cylindrical inlet and outlet valves, small pistons actuating said cylindrical valves and controlled by said electrically operated small valves, springs for bringing back said cylindrical valves to their initial position, large pistons controlled by said cylindrical inlet and outlet valves, said pistons being connected with said coupling means, a pneumatic power supply, a number of pneumatic actuating means for actuating the inlet and the outlet elements for the air of said pneumatic servo-motors, a number of electrical control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand-operated switch connected with said electric power supply, contact means on said switch corresponding with the electric current circuit of said distributing device, a further number of contact means on said switch corresponding respectively with the electric current circuits of the several electrical control means for controlling the distribution of the air in said first-mentioned number of pneumatic servo-motors, said contact means being arranged on said switch in such a way that either the electric current circuit of the distributing device or one of the circuits of the different electrical control means can be put in commission, such as desired, and a reverse gear adapted to be operated by means of a coupling mechanism actuated by a pneumatic servo-motor, said last mentioned pneumatic servo-motor being controlled by an electrical control device which can be put into and out of operation by means of said hand operated switch in such a way that by means of said switch either said automatic distributing device, or one of said ahead gears, or the reverse gear is put in operation.

19. Automatic change speed gear mechanism, specially adapted for motor vehicles, comprising a motor shaft, a cardan shaft, gear wheels fixed to said cardan shaft meshing with gear wheels rotatably mounted on said motor shaft, coupling means for coupling said gear wheels on the motor shaft with said motor shaft, springs for maintaining said coupling means in their inoperative positions, a number of pneumatic servo-motors for actuating said coupling means, a pneumatic power supply, inlet and outlet elements for the air of said pneumatic servo-motors, a number of pneumatic actuating means for actuating said inlet and outlet means, a number of electric control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electric control means for controlling the distribution of the air in said first mentioned number of pneumatic servo-motors, said contact means being arranged on said switch in such a way that either the electric current circuit of the distributing device or one of the circuits of the different electric control means can be put in commission, such as desired, said pneumatic servo-motor for actuating the current distributing device being formed as a manometer, and a reverse gear adapted to be operated by means of a coupling mechanism actuated by a pneumatic servo-motor, said last-mentioned pneumatic servo-motor being controlled by an electrical control device which can be put into and out of operation by means of said hand operated switch in such a way that by means of said switch either said automatic distributing device, or one of said ahead gears, or the reverse gear is put in operation.

20. Automatic change speed gear mechanism specially adapted for motor vehicles, comprising a motor shaft, a cardan shaft, a counter shaft, transmitting means for transmitting the torque from said countershaft to said cardan shaft, gear wheels freely rotating on said motor shaft constantly meshing with gear wheels fixed on said countershaft, coupling means for coupling said gear wheels on the motor shaft with said motor-shaft and for directly coupling said motor-shaft with said cardan shaft; springs for maintaining said coupling means in their inoperative positions, a number of pneumatic servo-motors for actuating said coupling means, a pneumatic power supply, inlet and outlet elements for the air of said pneumatic servo-motors, a number of pneumatic actuating means for actuating said inlet and outlet elements, a number of electric control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electrical control means for controlling the distribution of the air in said first-mentioned number of pneumatic servo-motors, said contact means being arranged on said switch in such a way that either the electric current circuit of the distributing device or one of the circuits of the different electric control means can be put in commission, such as desired, said pneumatic servo-motor for actuating the current distributing device being formed as a manometer, and a reverse gear adapted to be operated by means of a coupling mechanism actuated by a pneumatic servo-motor, said last mentioned pneumatic servo-motor being controlled by an electrical control device which can be put into and out of operation by means of said hand operated switch in such a way that by means of said switch either said automatic distributing device, or one of said ahead gears, or the reverse gear is put in operation.

21. Automatic change speed gear mechanism, specially adapted for motor vehicles, comprising a motor shaft, a cardan shaft, gear wheels fixed to said cardan shaft meshing with gear wheels rotatably mounted on said motor shaft, coupling means for coupling said gear wheels on the motor shaft with said motor shaft, springs for maintaining said coupling means in their inoperative positions, a number of pneumatic servo-motors for actuating said coupling means, comprising small electrically operated control valves, cylindrical inlet and outlet valves, small pistons actuating said cylindrical valves and controlled by said electrically operated small valves, springs for bringing back said cylindrical valves to their initial position, large pistons controlled by said cylindrical inlet and outlet valves, said pistons being connected with said coupling means, a pneumatic power supply, a number of pneumatic actuating means for actuating the inlet and the outlet valves for the air of said pneumatic servo-motors, a number of electrical control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electric control means for controlling the distribution of the air in said first-mentioned number of pneumatic servo-motors, said contact means being arranged on said switch in such a way that either the electric current circuit of the distributing device or one of the circuits of the different electric control means can be put in commission, such as desired, said pneumatic servo-motor for actuating the current distributing device being formed as a manometer, and a reverse gear adapted to be operated by means of a coupling mechanism actuated by a pneumatic servo-motor, said last mentioned pneumatic servo-motor being controlled by an electrical control device which can be put into and out of operation by means of said hand operated switch in such a way that by means of said switch either said automatic distributing device, or one of said ahead gears, or the reverse gear is put in operation.

22. Automatic change speed gear mechanism specially adapted for motor vehicles, comprising a motor shaft, a cardan shaft, a counter shaft transmitting means for transmitting the torque from said counter shaft to said cardan shaft, gear wheels freely rotating on said motor shaft constantly meshing with gear wheels fixed on said counter shaft, coupling means for coupling said gear wheels on the motor shaft with said motor-shaft and for directly coupling said motor-shaft with said cardan shaft, springs for maintaining said coupling means in their inoperative positions, a number of pneumatic servo-motors for actuating said coupling means, comprising small electrically operated control valves, cylindrical inlet and outlet valves, small pistons actuating said cylindrical valves and controlled by said electrically operated small valves, springs for bringing back said cylindrical valves to their initial position, large pistons controlled by said cylindrical inlet and outlet valves, said pistons being connected with said coupling means, a pneumatic power supply, a number of pneumatic actuating means for actuating the inlet and the outlet valves for the air of said pneumatic servo-motors, a number of electrical control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand-operated switch connected with said electric power supply, contact means on said switch corresponding with the electric current circuit of said distributing device, a further number of contact means on said switch corresponding respectively with the electric current circuits of the several electrical control means for controlling the distribution of the air in said first-mentioned number of pneumatic servo-motors, said contact means being arranged on said switch in such a way that either the electric current circuit of the distributing device or one of the circuits of the different electrical control means can be put in commission, such as desired, said pneumatic servo-motor for actuating the current distributing device being formed as a manometer, and a reverse gear adapted to be operated by means of a coupling mechanism actuated by a pneumatic servo-motor, said last mentioned pneumatic servo-motor being controlled by an electrical control device which can be put into and out of operation by means of said hand operated switch in such a way that by means of said switch either said automatic distributing device, or one of said ahead gears, or the reverse gear is put in operation.

23. Automatic change speed gear mechanism, specially adapted for motor vehicles, comprising a motor shaft, a cardan shaft, gear wheels fixed to said cardan shaft meshing with gear wheels rotatably mounted on said motor shaft, coupling means for coupling said gear wheels on the motor shaft with said motor shaft, springs for maintaining said coupling means in their inoperative positions, a number of pneumatic servo-motors for actuating said coupling means, comprising small electrically operated control valves, cylindrical inlet and outlet valves, small pistons actuating said cylindrical valves and controlled by said electrically operated small valves, springs for bringing back said cylindrical valves to their initial position, large pistons controlled by said cylindrical inlet and outlet valves, said pistons being connected with said coupling means, a pneumatic power supply, a number of pneumatic actuating means for actuating the inlet and the outlet valves for the air of said pneumatic servo-motors, a number of electrical control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand operated switch connected with said electric power supply, contact means on said switch corresponding with the electric current circuit of said distributing device, a further number of contact means on said switch corresponding respectively with the electric current circuits of the several electric control means for controlling the distribution of the air in said first-mentioned number of pneumatic servo-motors, said contact means being arranged on said switch in such a way that either the electric current circuit of the distributing device or one of the circuits of the different electric control means can be put in commission, such as desired, each of said pneumatic servo-motors for actuating the coupling means comprising two cylinders in which work two pistons which are fixed on a single piston rod and the cylindrical valves which control the inlet of the air into said cylinders being provided with an overlap which is different for both cylinders, and a reverse gear adapted to be operated by means of a coupling mechanism actuated by a pneumatic servo-motor, said last mentioned pneumatic servo-motor being controlled by an electrical control device which can be put into and out of operation by means of said hand operated switch in such a way that by means of said switch either said automatic distributing device, or one of said ahead gears, or the reverse gear is put in operation.

24. Automatic change speed gear mechanism specially adapted for motor vehicles, comprising a motor shaft, a cardan shaft, a counter shaft, transmitting means for transmitting the torque from said counter shaft to said cardan shaft, gear wheels freely rotating on said motor shaft constantly meshing with gear wheels fixed on said countershaft, coupling means for coupling said gear wheels on the motor shaft with said motor-shaft and for directly coupling said motor-shaft with said cardan shaft, springs for maintaining said coupling means in their inoperative positions, a number of pneumatic servo-motors for actuating said coupling means, comprising small electrically operated control valves, cylindrical inlet and outlet valves, small pistons actuating said cylindrical valves and controlled by said electrically operated small valves, springs for bringing back said cylindrical valves to their initial position, large pistons controlled by said cylindrical inlet and outlet valves, said pistons being connected with said coupling means, a pneumatic power supply, a number of pneumatic actuating means for actuating the inlet and the outlet valves for the air of said pneumatic servo-motors, a number of electrical control means for controlling said pneumatic actuating means, an automatically operating electric current distributing device comprising a number of contact pieces corresponding with the number of ahead gears, another pneumatic servo-motor for actuating said current distributing device, said last-mentioned pneumatic servo-motor operating under the influence of the change of pressure generated by a fan, which is driven by said cardan shaft, an exhausting valve on the pressure conduit leading from said fan to said last-mentioned pneumatic servo-motor, connecting means for connecting said exhausting valve with the fuel admission mechanism of the motor, an electric power supply, a hand-operated switch connected with said electric power supply, contact means on said switch corresponding with the electric current circuit of said distributing device, a further number of contact means on said switch corresponding respectively with the electric current circuits of the several electrical control means for controlling the distribution of the air in said first-mentioned number of pneumatic servo-motors, said contact means being arranged on said switch in such a way that either the electric current circuit of the distributing device or one of the circuits of the different electrical control means can be put in commission, such as desired, each of said pneumatic servo-motors for actuating the coupling means comprising two cylinders in which work two pistons which are fixed on a single piston rod and the cylindrical valves which control the inlet of the air into said cylinders being provided with an overlap which is different for both cylinders, and a reverse gear adapted to be operated by means of a coupling mechanism actuated by a pneumatic servo-motor, said last-mentioned pneumatic servo-motor being controlled by an electrical control device which can be put into and out of operation by means of said hand operated switch in such a way that by means of said switch either said automatic distributing device, or one of said ahead gears, or the reverse gear is put in operation.

25. In a change speed gear mechanism for gradually varying the speed of a mechanism to be driven, speed-changing gearing, a driven shaft, pneumatic means responsive to variations in the speed of rotation of said shaft, electrical means successively actuable by said pneumatic means, and other pneumatic means controlled by said electrical means for shifting the gearing automatically in accordance with the speed of the driven shaft.

26. In combination with a change speed gear mechanism, pneumatic means for shifting clutches associated with the gears of said mechanism in a smooth manner, a second pneumatic means for controlling the first said means, electrical means for controlling said second pneumatic means, a third pneumatic means for controlling said electrical means, and manually operable means for rendering said third pneumatic means ineffective to control said electrical means, said manually operable means permitting manual control of said electrical means.

JOHAN MACHIEL VETTER.